C. KIBAT.
SLED PROPELLER.
APPLICATION FILED MAR. 20, 1908.
903,387.
Patented Nov. 10, 1908.
2 SHEETS—SHEET 1.
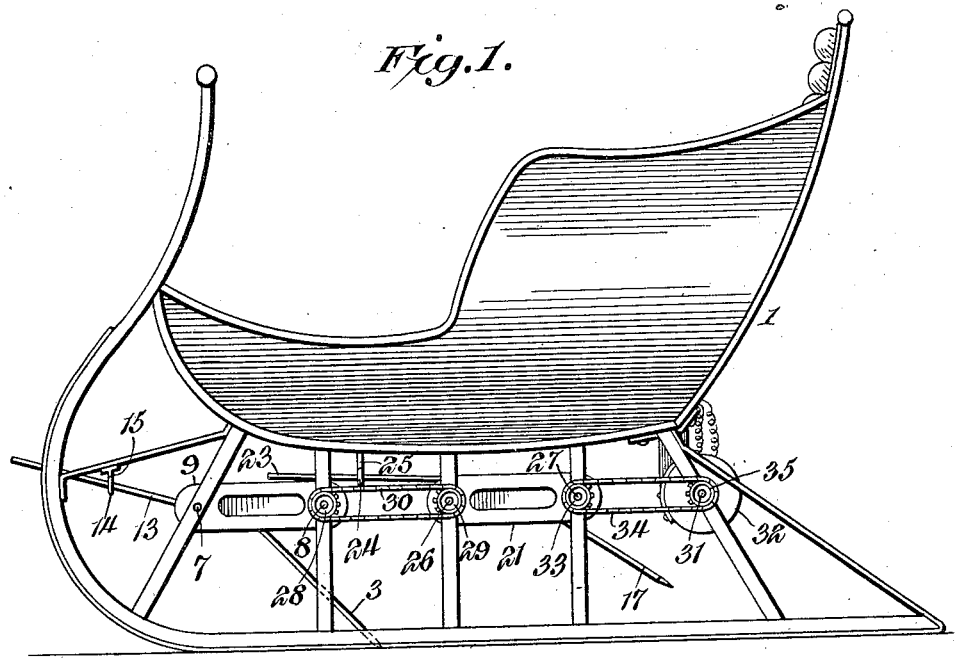
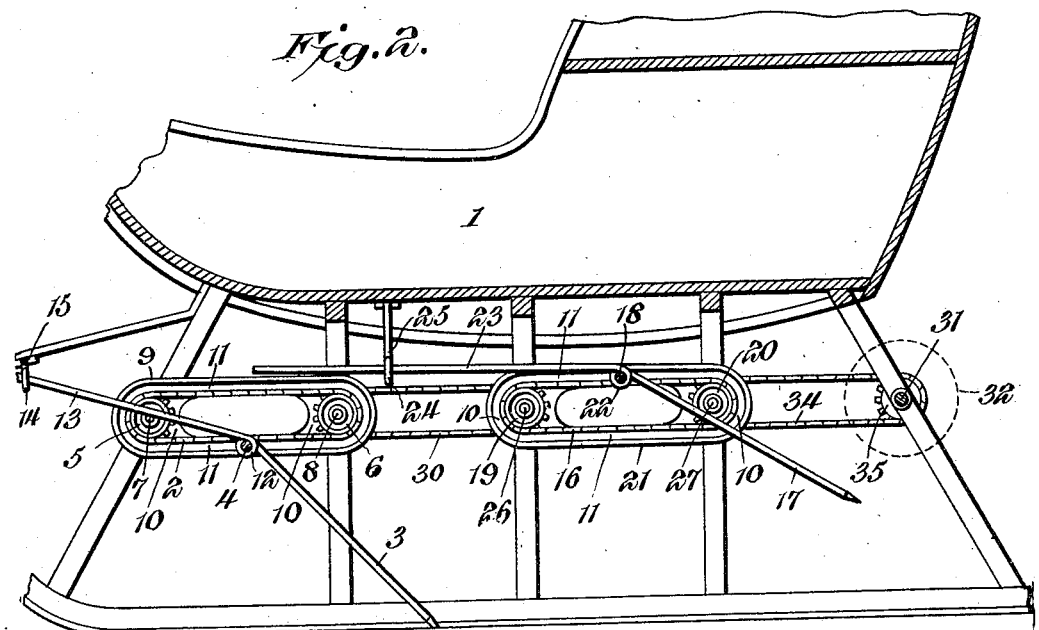
Christopher Kibat, Inventor,
Witnesses
Howard D. Orr.
By
Attorney C. KIBAT.
SLED PROPELLER.
APPLICATION FILED MAR. 20, 1908.
903,387.
Patented Nov. 10, 1908.
2 SHEETS—SHEET 2.
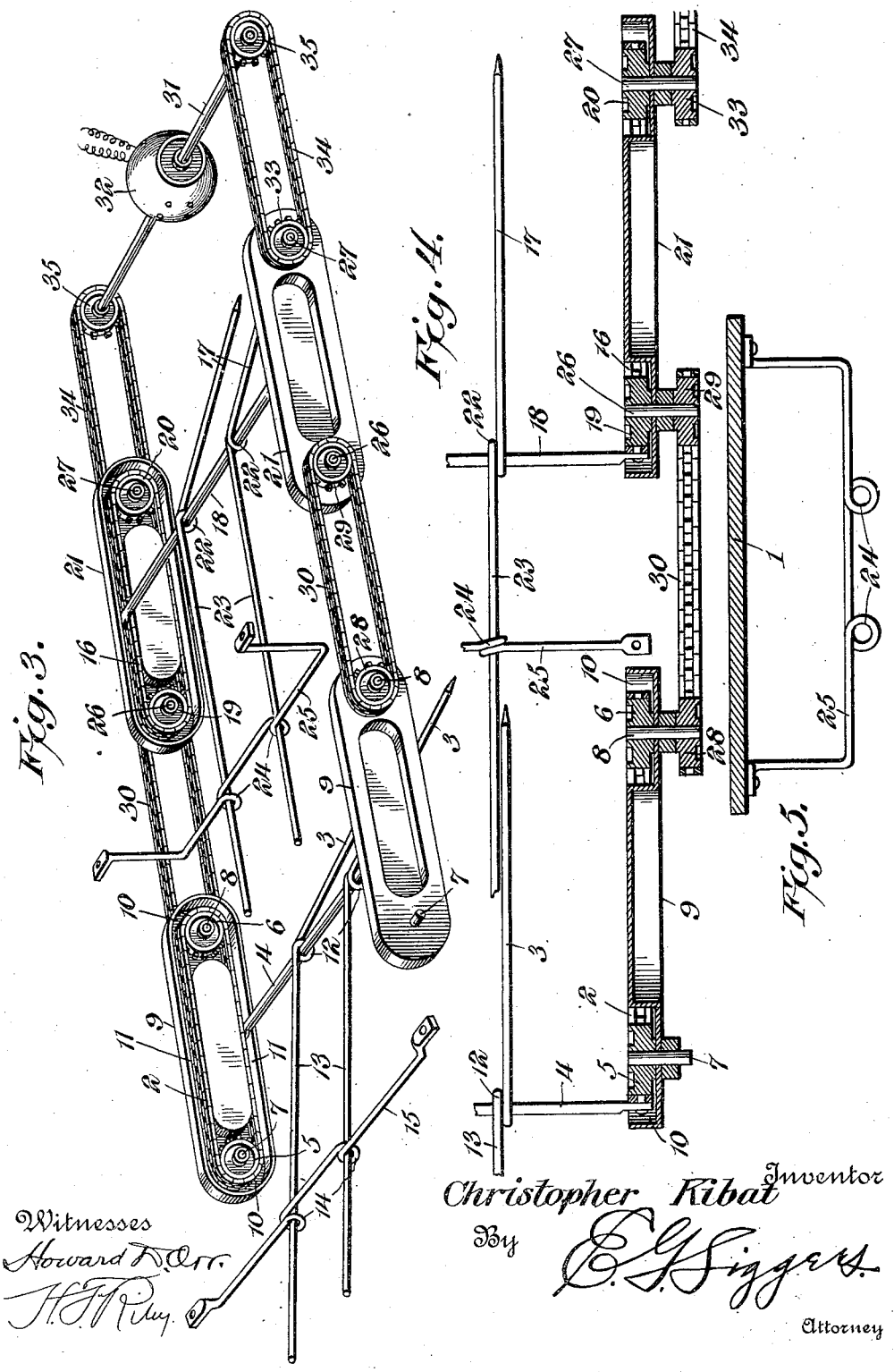
Witnesses
Howard F. Orr.
H. T. Riley.
Christopher Kibat, Inventor
By C. G. Siggers.
Attorney

UNITED STATES PATENT OFFICE.

CHRISTOPHER KIBAT, OF BELVIDERE, ILLINOIS.

SLED-PROPELLER.

No. 903,387.     Specification of Letters Patent.     Patented Nov. 10, 1908.

Application filed March 20, 1908. Serial No. 422,303.

*To all whom it may concern:*

Be it known that I, CHRISTOPHER KIBAT, a citizen of the United States, residing at Belvidere, in the county of Boone and State of Illinois, have invented a new and useful Sled-Propeller, of which the following is a specification.

The invention relates to improvements in sled propellers.

The object of the present invention is to improve the construction of sled propellers, and to provide a simple, inexpensive and efficient sled propelling device, adapted to be readily applied to a sled, bicycle, automobile, or other vehicle equipped with motor power, and capable of enabling the same to be positively and rapidly propelled.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a side elevation of a sleigh, provided with a sled propeller, constructed in accordance with this invention. Fig. 2 is a longitudinal sectional view of the same. Fig. 3 is an enlarged perspective view of the sled propeller detached from the sleigh. Fig. 4 is a horizontal sectional view of the same. Fig. 5 is a detail view, illustrating the construction of the rear guide.

Like numerals of reference designate corresponding parts in all the figures of the drawings.

The sled propeller comprises front and rear propelling devices, constructed substantially the same and arranged for successively actuating a sleigh 1, so that the latter will be positively actuated during substantially the entire period the mechanism is in operation. The front propelling device includes a pair of spaced endless sprocket chains 2, and a pair of propelling members 3, located between the endless sprocket chains and connected with the same by a transverse rod 4. The endless sprocket chains 2, which are located at opposite sides of the sleigh, are arranged on front and rear sprocket wheels 5 and 6, which are mounted on front and rear shafts 7 and 8 of longitudinal guides 9. The upper and lower flights of the sprocket chains are horizontal, and the guides 9, which conform to the configuration of the endless sprocket chains, are provided with terminal recesses 10 and upper and lower connecting grooves 11. The sprocket wheels 5 and 6 are located within the end recesses of the guides, and the upper and lower grooves, which receive the upper and lower flights of the sprocket chains, are adapted to support and brace the same. The guides also form casings or housings for the endless sprocket chains.

The transverse rod 4 is suitably secured to the endless sprocket chains, and the propelling members 3, which consist of rods, are provided with eyes 12, receiving the transverse rod 4 and permitting the same to turn therein as the rod is carried around the ends of the guide by the sprocket chains. The propelling rods or members 3 are provided with forwardly extending arms 13, arranged in and slidable through guiding eyes 14 of a front transverse guide 15, consisting of a rod secured at its ends to the front portion of the sleigh. The guides and the arms 13 maintain the propelling rods or arms in proper position with relation to the snow, ice, or other supporting surface for propelling the sled. The lower flights of the endless sprocket chains carry the propelling rods rearwardly with relation to the sleigh, and the endless chains lift the rods or arms 3 at the rear ends of the side guides 9. The upper flights of the endless sprocket chains carry the rods or members 3 forwardly, and when the latter reach the front ends of the side guides, they are carried downwardly by the endless chains and are again engaged with the snow, ice, or other supporting surface.

The rear propelling device includes a pair of endless sprocket chains 16, propelling rods or members 17, and a transverse rod 18 connecting the propelling rods or members with the rear endless sprocket chains. The rear endless sprocket chains 16, which are arranged on front and rear sprocket wheels 19 and 20, are housed within side guides 21, provided with terminal recesses and having upper and lower grooves similar to those of the front side guides. The front and rear side guides are slidably mounted on the sleigh and are arranged below the body thereof, as clearly shown in Figs. 1 and 2 of the drawings. The rods or members 17, which are provided with eyes 22 to receive the transverse rod 18, are equipped with forwardly projecting arms 23, which slide through eyes 24 of a rear transverse guide 25, having upwardly extending arms secured to the bottom of the body of the sleigh. The front and rear sprocket wheels 19 and 20 are mounted on shafts 26 and 27, and the front and rear propelling devices are connected together by sprocket gearing, consisting of sprocket wheels 28 and 29, and an endless sprocket chain 30. The sprocket wheels 28 and 29 are mounted on the rear shafts 8 of the front propelling device, and the sprocket wheels 29 are mounted on the front shafts 26 of the rear propelling device. The sprocket gearing for connecting the front and rear propelling devices are arranged on the exterior of the side guides at the outer faces thereof, and the rear shafts 27 of the rear propelling devices are connected by sprocket gearing with the power shaft 31 of a motor 32. This sprocket gearing comprises front sprocket wheels 33, mounted on the rear shafts 27 and receiving endless sprocket chains 34, which extend from the rear shafts 27 to sprocket wheels 35, mounted on the ends of the power shaft. The power shaft extends across the sleigh, the motor 32 being arranged at an intermediate point, but any other desired arrangement may be employed for actuating the sled propeller. Also the sled propeller may be operated by hand or foot power, and one or more propelling devices may be employed.

The propelling rods or members of the front and rear propelling devices are arranged so that when the front rods or members are carried into engagement with the supporting surface, the rear rods or members will be lifted from the same, and when the front rods or members are carried rearwardly, the rear rods or members will be carried forwardly, so that one pair or set of propelling rods or members will be actuating the sled except at the instant when one is being lifted from the snow and the other is being moved downward into engagement with the same. By this arrangement there will be no liability of the sled slipping backward while being propelled up an incline.

The endless chains, which reciprocate the propelling rods or members longitudinally, operate to raise the rods or members at the end of the rear stroke, and they lower the rods or members at the end of the front stroke, and the guides through which the rods slide serve as fulcrums in the upward and downward swinging movement of the rods or members.

Having thus fully described my invention, what I claim as new and desire to secure by Letters Patent, is:—

1. The combination with a sled, of spaced endless chains mounted thereon, a longitudinally reciprocatable propelling member located between and connected with and actuated by the chains, and guiding means through which the propelling member slides, said guiding means forming a fulcrum for the propelling member.

2. The combination with a sled, of spaced endless chains mounted thereon, a propelling member located between and connected with and actuated by the endless chains, and side guides forming casings and provided with grooves receiving the endless chains and supporting and bracing the flights thereof.

3. The combination with a sled, of spaced endless chains, side guides forming casings for the endless chains and having grooves receiving the flights of the said endless chains, a propelling rod or member located between the endless chains and the transverse rod secured at its ends to the endless chains and carrying the propelling rod or member.

4. The combination with a sled, of spaced endless chains, an intermediate propelling rod or member located between, connected with and carried by the endless chains and provided with a forwardly projecting arm, and a fixed guide in which the arm slides.

5. The combination with a sled, of endless chains mounted thereon, a fixed guide also mounted on the sled, and a propelling rod or member slidable through and fulcrumed in the guide and located between and connected at an intermediate point with the endless chains.

6. The combination with a sled, of spaced endless chains, a transverse rod connecting the chains, a plurality of propelling rods or members mounted on the transverse rod and located between the chains and having projecting arms, and a fixed transverse guide mounted on the sled and having openings receiving the said arms.

7. The combination with a sled, of side guides mounted on the sled and provided with terminal recesses and having longitudinal grooves connecting the same, sprocket wheels mounted in the recesses of the side guides, endless chains arranged on the sprocket wheels and having flights extending through the said grooves, a transverse rod connecting the chains, a plurality of propelling rods or members mounted on the transverse rod having projecting arms, and a transverse guide provided with openings in which the arms slide.

8. The combination with a sled, of front and rear propelling devices, each including spaced endless chains, a rod connecting the chains, and propelling means carried by the rod, sprocket gearing connecting the front and rear propelling devices, a power shaft, and sprocket gearing connecting the power shaft with the rear propelling devices.

9. The combination with a sled, of an endless chain mounted thereon, a guide also mounted on the sled, and a longitudinally reciprocatable propelling member slidable through the guide and connected with and actuated by the chain, said guide also forming a fulcrum for the propelling member.

10. The combination with a sled, of an endless chain mounted thereon, a fixed guide also mounted on the sled, and a longitudinally reciprocatable propeller member slidable through and fulcrumed in the guide and connected at an intermediate point with and actuated by the endless chain.

11. The combination with a sled, of a propelling member disposed longitudinally of the sled, means for reciprocating the propelling member longitudinally and for raising the propelling member at the end of one of the strokes and lowering the same at the end of the other stroke, and guiding means for the propelling member, said guiding means forming a fulcrum for the propelling member when the same is swung upward and downward.

In testimony, that I claim the foregoing as my own, I have hereto affixed my signature in the presence of two witnesses.

CHRISTOPHER KIBAT.

Witnesses:
E. K. HERSTER,
W. J. KIRK.